W. K. HENRY.
KNOB ATTACHMENT.
APPLICATION FILED SEPT. 10, 1909.
951,275.
Patented Mar. 8, 1910.
2 SHEETS—SHEET 1.
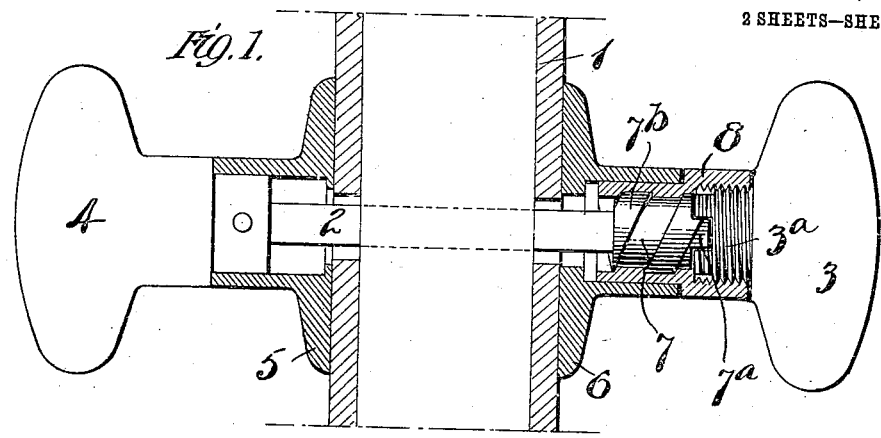
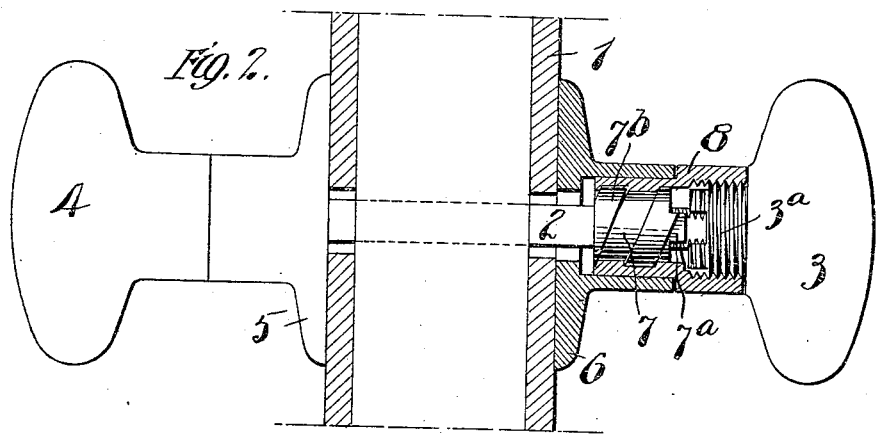
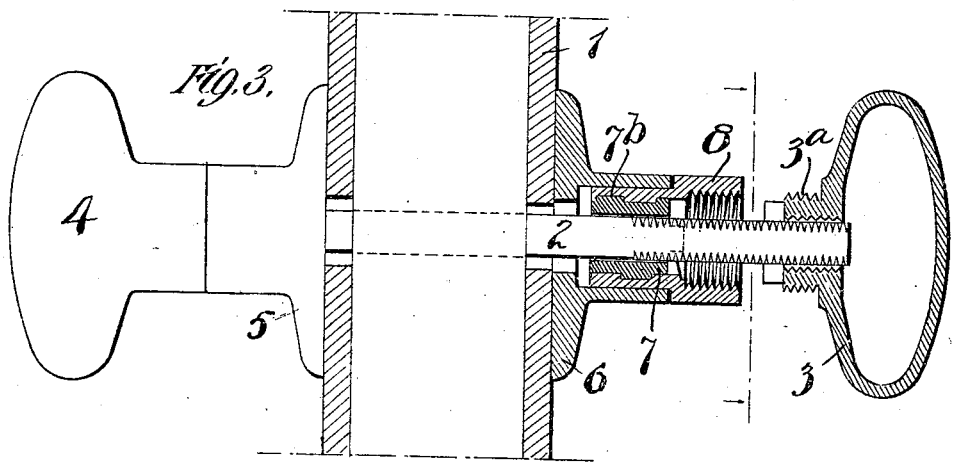
Witnesses:
Inventor
W. K. Henry

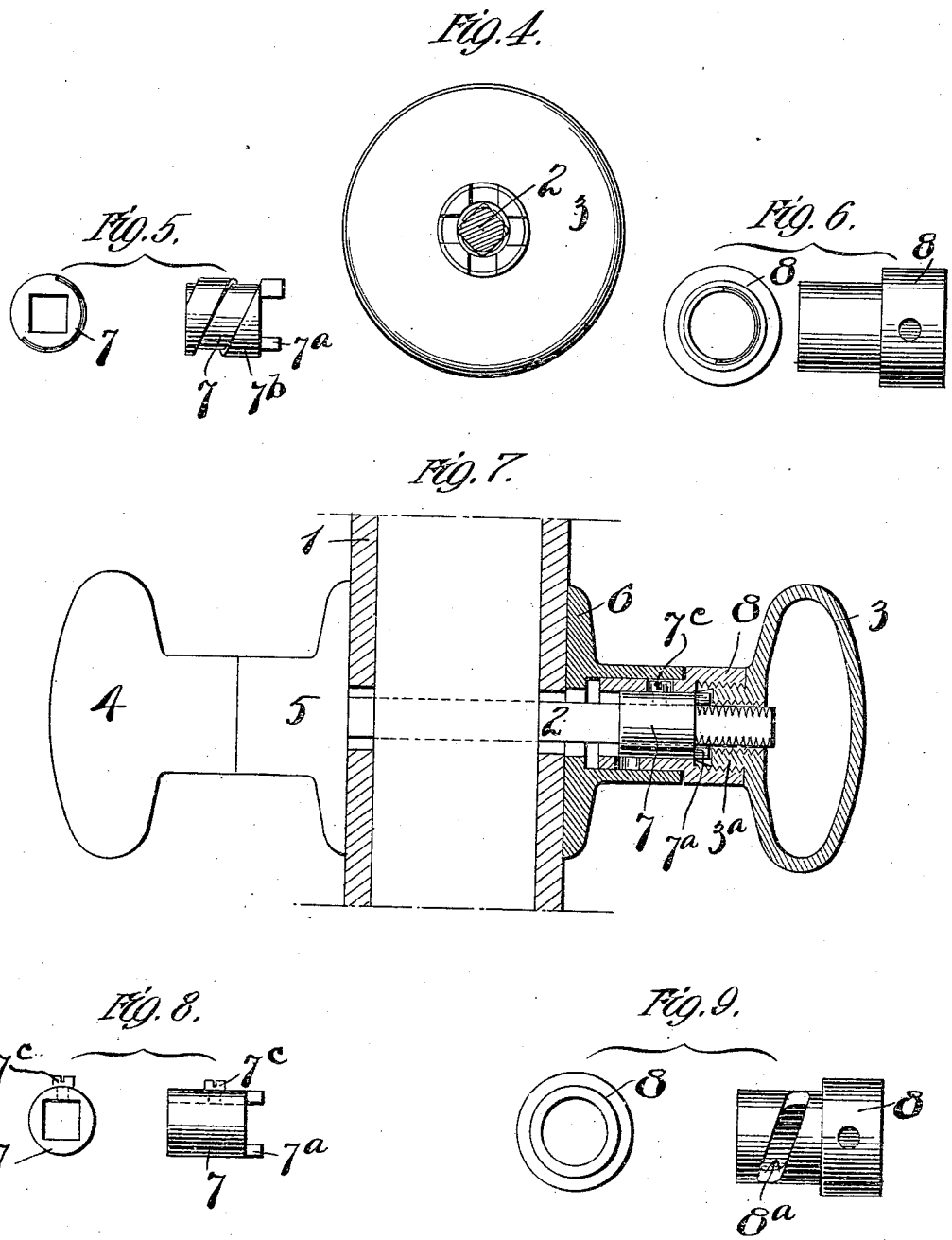

UNITED STATES PATENT OFFICE.

WILLIAM K. HENRY, OF NEW BRITAIN, CONNECTICUT, ASSIGNOR TO P. & F. CORBIN, OF NEW BRITAIN, CONNECTICUT, A CORPORATION OF CONNECTICUT.

KNOB ATTACHMENT.

951,275.  Specification of Letters Patent.  Patented Mar. 8, 1910.

Application filed September 10, 1909. Serial No. 517,008.

*To all whom it may concern:*

Be it known that I, WILLIAM K. HENRY, a citizen of the United States, residing at New Britain, county of Hartford, State of Connecticut, have invented certain new and useful Improvements in Knob Attachments, of which the following is a full, clear, and exact description.

My invention relates to new and useful improvements in "screwless" knobs, so called, the object of the invention being to provide a simple and effective mechanism for securing a knob to a spindle without the aid of the usual transverse screws.

In the accompanying drawings, Figure 1 is, in the main, a longitudinal sectional elevation of my invention as applied to a door; Figs. 2 and 3 are similar views showing the same parts in different positions; Fig. 4 is an end view of the "screwless" knob with the spindle in section; Fig. 5 illustrates an end and side elevation of a detail which I will term the clutch; Fig. 6 is an end and side elevation of what I will term the operating device; Fig. 7 is a view similar, in the main, to Fig. 1 and illustrating a modification; Fig. 8 is an end and side elevation of the clutch illustrated in Fig. 7; and, Fig. 9 is an end and side elevation of the operating device shown in Fig. 9.

1 illustrates a portion of a door. 2 is a spindle passing therethrough.

3 represents the knob which I will refer to as the "screwless" knob in that it is to be applied to the spindle 2 without the aid of the usual transverse screw arranged to pass through the knob shank. In the form shown, the spindle 2 carries a fixed knob 4 at one end.

5 is a rose bearing for the knob 4.

6 is a rose bearing for the screwless knob 3.

The knob 3 has a threaded shank 3ª, the forward end of which is provided with a clutch face formed, for example, by a transverse slot extending diametrically to the end of the shank.

7 is a clutch nut having a clutch end 7ª arranged to coöperate with the clutch end of the shank end 3ª. The clutch 7 has a steeply pitched external spiral 7ᵇ.

8 is an operating sleeve shouldered properly to bear against the end of the rose bearing 6 and screw-threaded to take on to the screw threaded shank 3ª of the screwless knob. The inner end of the operating device 8 is provided with a spiral groove corresponding to the spiral portion 7ᵇ on the clutch 7.

The corners of the spindle 2 are threaded, as best seen in Fig. 3, and the bore of the shank of the screwless knob 3 is also threaded so that the said knob may be screwed up on said spindle 3 to the desired position of adjustment.

While the knob is being screwed upon the spindle 3, the threaded end of the shank 3ª will also enter the threaded end of the operating sleeve 8, which should be held while the threads are being meshed in approximately the desired position at which it is desired to secure the knob relatively to the other parts. While the knob 3 is being screwed in, the sleeve 8 should be held stationary relatively to the spindle and also relatively to the clutch 7. The clutch 7 has a square bore so that it may slide but not turn on the spindle. It follows from the foregoing that a partial rotation of the sleeve 8 will, by reason of the spiral connection between the sleeve and clutch, cause the latter to advance or retract. When the parts are being assembled, obviously the clutch should be retracted. When the knob has been applied as indicated in Fig. 3, and has been screwed up into the position indicated in Fig. 2, a partial rotation of the operating sleeve will cause the clutch 7 to shift from the position shown in Fig. 2 to the position shown in Fig. 1, in which the clutch end interlocks with the clutch end at the end of the knob shank 3ª. This interlocking of the clutch 7 with the knob shank prevents the rotation of the latter relatively to the spindle 2 and hence the knob can not be shifted until the controlling member 8 is reversed and the clutch 7 moved back to the position indicated in Fig. 2, after which, of course, the knob 3 is free to be rotated in a direction to withdraw the same from the spindle 2. If, by chance, the engagement between the parts 6, 8 and 3, namely, the rose, operating sleeve and knob, is too tight, the clutch should be withdrawn and the knob turned back one-quarter or one-half a turn as desired, or even more, to give the proper degree of freedom, following which the clutch may be again engaged with the knob shank. By this arrangement it is apparent that a knob may be very simply and quickly adjusted and located upon a spindle.

The jamming of the sleeve 8 against the knob serves to frictionally lock the parts in position. Any suitable wrench, such as a spanner, may be employed to operate the sleeve.

In Figs. 7, 8 and 9, I have shown a modification in which the only changes involved comprise a pin $7^c$ on the clutch 7 instead of a spiral such as $7^a$. In this modification also a spiral slot $8^a$ is formed in the operating sleeve 8 instead of a spiral thread, the pin $7^c$ entering said slot. Obviously this is a full mechanical equivalent of the spiral connection between the clutch and operating device shown in Figs. 1 to 6 inclusive.

What I claim is:

1. In a device of the character described, a spindle, a knob, a screw-threaded connection between said knob and spindle, a clutch slidable but not rotatable on said spindle and arranged, when in one position, to hold the knob from turning on the spindle, a device for moving said clutch, said device comprising a sleeve surrounding and operatively connected with said clutch, a portion of said sleeve being exposed for manual engagement, the exposed portion of said sleeve overstanding a portion of the knob and being threaded thereon.

2. In a device of the character described, a spindle, a knob having a shank mounted thereon, a threaded connection between said knob shank and spindle, an external screw-thread on the knob shank, a clutch slidable but not rotatable on said spindle, said spindle, said clutch being arranged to engage the end of said knob shank to hold it from turning, means for shifting said clutch, comprising an operating sleeve mounted upon the external part of said knob shank, and a spiral connection between said sleeve and clutch of steeper pitch than the threads upon the external part of said knob shank.

WILLIAM K. HENRY.

Witnesses:
C. E. WETMORE,
WM. V. COLLUM.